R. B. GRIMM.
WATER CLOSET VALVE.
APPLICATION FILED NOV. 3, 1911.
1,087,910. Patented Feb. 17, 1914.
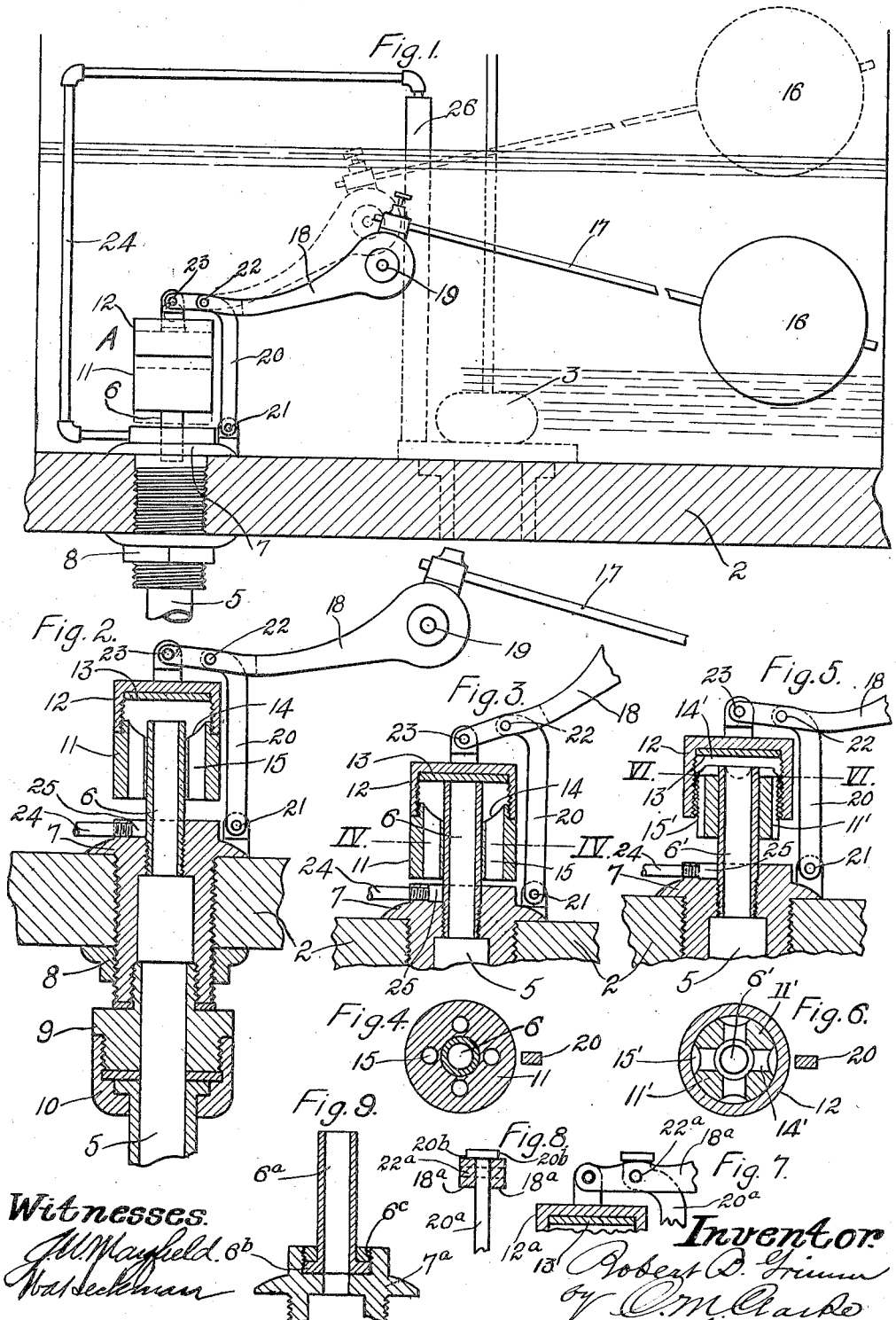

UNITED STATES PATENT OFFICE.

ROBERT B. GRIMM, OF PITTSBURGH, PENNSYLVANIA.

WATER-CLOSET VALVE.

1,087,910.   Specification of Letters Patent.   Patented Feb. 17, 1914.

Application filed November 3, 1911. Serial No. 658,350.

*To all whom it may concern:*

Be it known that I, ROBERT B. GRIMM, a citizen of the United States, residing at Pittsburgh, in the county of Allegheny and State of Pennsylvania, have invented certain new and useful Improvements in Water-Closet Valves, of which the following is a specification.

My invention consists of an improvement in water closet valves.

It has for its object to provide a valve controlling the flow of water to the tank, subject to the float, which shall be noiseless in its action, simple in construction, of few parts, durable and effective.

It consists of a valve mounted upon a vertical hollow inlet stem, and is constructed and adapted to operate in the manner hereinafter described.

In the drawings: Figure 1 is a sectional view of a portion of a tank provided with my improved valve. Fig. 2 is a vertical sectional view on an enlarged scale, showing the valve open and its connected parts. Fig. 3 is a partial similar sectional view, showing the valve closed. Fig. 4 is a cross section on the line IV. IV. of Fig. 3. Fig. 5 is a view similar to Fig. 3, showing a modified construction. Fig. 6 is a cross section on the line VI. VI. of Fig. 5. Figs. 7 and 8 are detail views showing a modified arrangement of the lever connection for the valve. Fig. 9 is a sectional view showing the manner of connecting a porcelain terminal tube.

The valve A is for the purpose of controlling the flow of water into the tank 2 of a water closet under the control of a float of usual construction, as the water is flushed from the tank by the customary outlet valve 3 indicated in dotted lines. Water is supplied to the valve A by pipe 5 and any suitable fitting or connecting devices adapted for mounting on the tank bottom and adapted to deliver the water through a terminal pipe or tube 6. Said tube, which may be of brass or other suitable material, is fixedly secured in the top of a hollow fitting or base section 7 adapted to be secured to the tank by a nut 8. The water supply pipe 5 may be connected directly to said section 7, but in the case of non-standard threads, I may use a bushing 9 and union 10, with the necessary packing washers, etc., to make a tight joint, for connecting the pipe 5, as shown.

Slidingly mounted on the vertical hollow stem or tube 6 is a bushing 11 to which is connected by threads the cap 12 containing a rubber packing washer 13 adapted to make a sealing seat on top of tube 6. The top of bushing 11 is hollowed out, as shown at 14, and a plurality of circulation ports 15 extend vertically through it for escape of water downwardly when the valve is raised, as in Fig. 2.

The valve is raised and lowered by the action of float 16 mounted on the end of rod 17 which is adjustably mounted to the end of the arm 18. Said arm is fulcrumed at 22 on a pivot, pin or rivet at the upper end of links 20. Said links are pivoted at 21 to the top of fitting 7 and at their upper ends are deflected toward the center of the valve so as to bring the pivotal joint 22 close to the pivotal connection 23 of arm 18 with cap 12. By this means the leverage of float 16 is increased to a maximum.

If desired, the circulation ports 15, instead of being through the body of the bushing 11, may be between its exterior and the inner side of cap 12, as shown at 15'. In such construction the bushing 11' may be grooved across the top, as indicated at 14'. The stem 6 is secured in any suitable manner in the top of section 7 or may be made integral with it if desired. In Fig. 9 I show a porcelain tube $6^a$ mounted by its base $6^a$ and secured by a retaining nut $6^c$ in the top of fitting $7^a$. By making the tube of porcelain or other similar material, I avoid any wear or abrasion due to the action of the valve, flow of water, etc., thus keeping it at its highest efficiency. If desired the connections 20 may be in one piece, centrally arranged, as in Fig. 7, extending up through a central slot in arm $18^a$ and pivoted thereto by pin $22^a$ being connected to the cap $12^a$ in the same manner already described.

Connection $20^a$, above the pivotal joint, is provided with flanges $20^b$ which rest across the top of lever $18^a$ so that if the pivot pin is lost or broken, the lever action will continue unimpaired, due to the flange engagement. Connection is made with the base by a pipe 24, the inner end of which communicates with an upwardly directed port 25 in the base 7 and which is in the line of flow of the water downwardly through port 15. The other end of pipe 24 communicates with a pipe 26 leading through the base of the flushing valve seat to the closet bowl. By this connection I provide for the necessary flow of water to insure a sealing body of water in the bowl outlet after each flushing operation.

What I claim is:—

1. A water closet valve comprising a hollow cylindrical supply stem and a cylindrical valve embodying a terminal cap slidably mounted thereon by a central cylindrical bore and provided within its body portion with downwardly directed circulation ports spaced outwardly beyond the central bore, and an inserted packing gasket in the upper portion of the valve adapted to seat on the top of the supply stem and to open or close circulation through said ports and stem, substantially as set forth.

2. In a water closet valve, the combination with an upwardly projecting hollow cylindrical stem communicating with a water supply and adapted to extend into a flush tank, of a cylindrical vertically movable valve embodying a terminal cap having a central cylindrical bore slidably mounted on said stem and having a sealing gasket in the cap and circulation ports within the body portion of the valve spaced outwardly beyond the central bore, and a pivotally mounted lever connected with said valve and having a float, substantially as set forth.

3. The combination of a circulation fixture adapted for connection with a tank and a water supply, a hollow cylindrical stem extending upwardly therefrom, a pivotal support mounted on the fixture, a cylindrical valve having a central cylindrical bore slidably mounted on said stem and having a covering cap, a sealing gasket inserted in the cap, and downwardly extending circulation ports within the body portion of the valve spaced outwardly beyond the central bore, and an operating lever pivotally connected with said valve and pivotal support, substantially as set forth.

4. In a valve, the combination of a vertically arranged hollow cylindrical stem open at its ends, a base therefor having a passage way adapted for connection with a source of supply and in communication with said stem, a supporting link pivoted to said base, a cylindrical valve having a central cylindrical bore slidably mounted on said stem and having an upper portion containing an inserted sealing gasket and downwardly directed circulation ports within its body spaced outwardly beyond the central bore, and an operating lever pivotally connected with said valve and with the upper end of said supporting link, substantially as set forth.

5. In a valve, the combination of a vertically arranged hollow cylindrical stem open at its ends, a base therefor having a passage way adapted for connection with a source of supply and in communication with said stem, a supporting link pivoted to said base and having an upper deflected pivoting terminal, a cylindrical valve having a central cylindrical bore slidably mounted on said stem and having an upper portion containing an inserted sealing gasket and downwardly directed circulation ports within its body spaced outwardly beyond the central bore, and an operating lever pivotally connected with said valve and the deflected pivoting terminal of said supporting link, substantially as set forth.

In testimony whereof I hereunto affix my signature in the presence of two witnesses.

ROBERT B. GRIMM.

Witnesses:
C. M. CLARKE,
FREDK. STAUB.